Feb. 5, 1935. V. G. APPLE ET AL 1,989,673
BRAKE MECHANISM
Filed Nov. 16, 1929 2 Sheets-Sheet 1
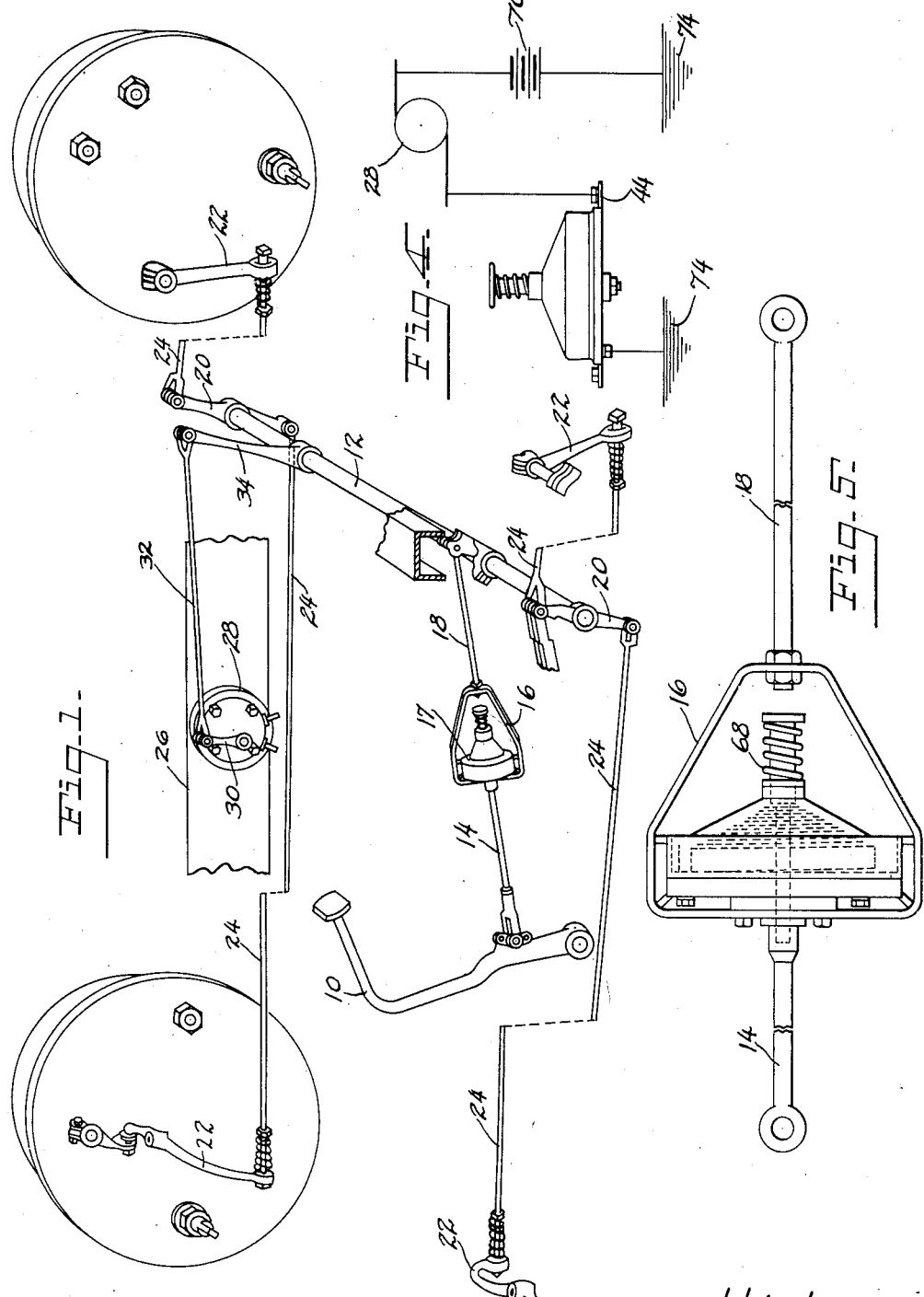

Feb. 5, 1935.  V. G. APPLE ET AL  1,989,673
BRAKE MECHANISM
Filed Nov. 16, 1929   2 Sheets-Sheet 2
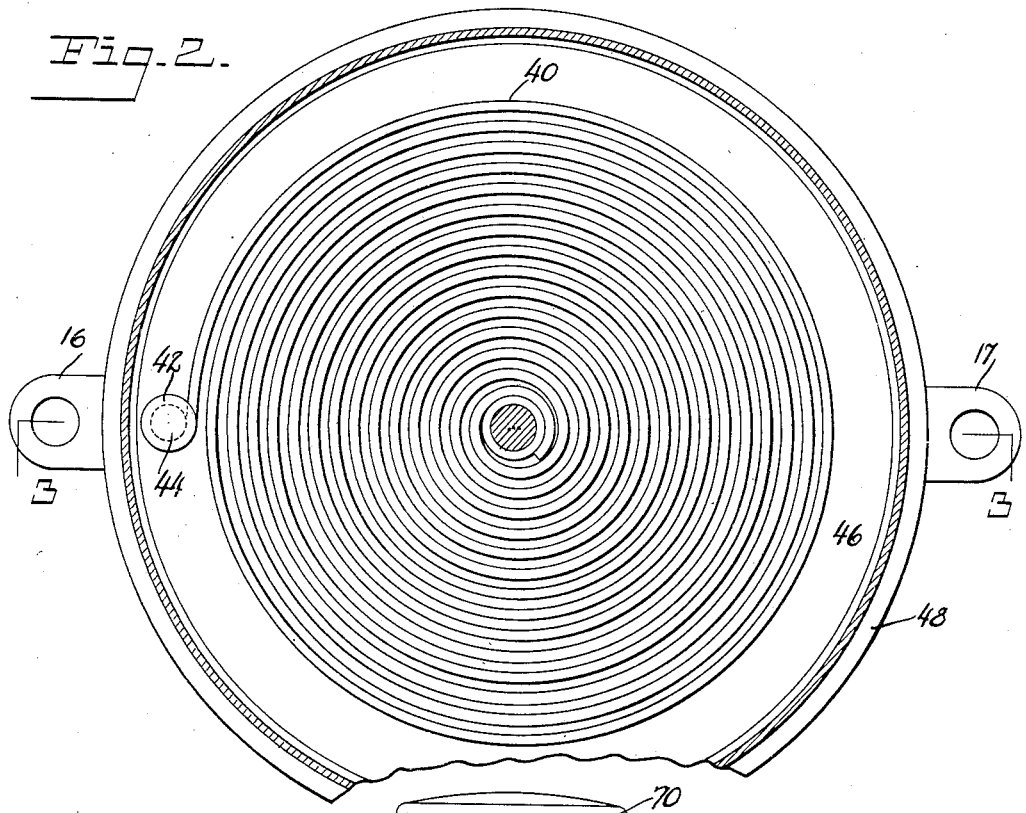
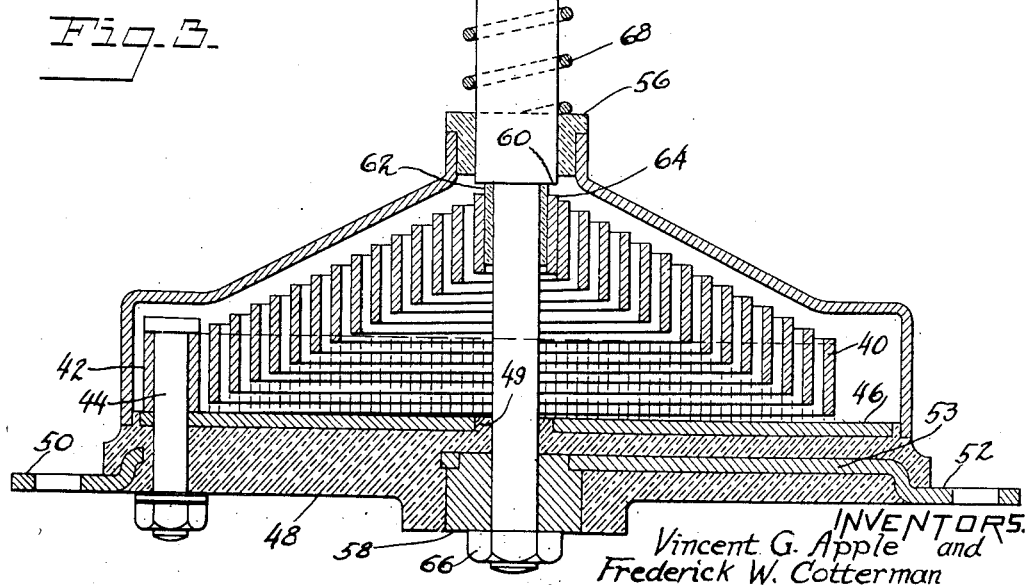
INVENTORS.
Vincent G. Apple and
Frederick W. Cotterman
BY Burton & McConkey ATTORNEYS Patented Feb. 5, 1935

1,989,673

UNITED STATES PATENT OFFICE 1,989,673

BRAKE MECHANISM

Vincent G. Apple and Frederick W. Cotterman, Dayton, Ohio, assignors to Bendix Brake Company, South Bend, Ind., a corporation of Illinois Application November 16, 1929, Serial No. 407,765

9 Claims. (Cl. 188—156)

Our invention relates to improvements in power control mechanism and particularly to control mechanism adapted to regulate the amount of power delivered by a suitable power machine to operating mechanism such as a brake.

An object is the provision of control mechanism of this character wherein the power impulse applied to the device to be operated thereby is proportioned as a function of a manual impulse likewise applicable to operate the device.

It is particularly useful in conjunction with brake mechanism for an automotive vehicle and is here shown as embodied in such an arrangement wherein the brakes are connected with a conventional manual operating member such as a pedal to be actuated thereby. In such a construction our improved controller is of such a character and is so coupled with the manual operating member and with the power means, which power means is coupled with the brakes to power actuate them, to cause said power means to deliver brake actuating power in proportion to the force exerted by the driver upon the manual operating member for the same purpose.

Power mechanism has heretofore been provided to supplement the brake applying effort of the manual operating means but the power booster mechanism has not been extensively adopted as the power booster has a tendency to carry the foot of the driver down and if this occurs at a rapid rate and with much magnitude, the power device may take control away from the driver. For this reason the driver's foot has heretofore been called upon to do a large measure of the braking.

In using a power booster it is highly desirable that the brake applying effort of such power means not only be fully under the control of the driver but that the driver be instinctively conscious of the amount of effort being delivered at any given moment. In the operation of brakes by mechanical means the brake pedal offers resistance to movement by the driver in proportion to the brake effort being exerted and by virtue of such resistance the driver is instinctively aware of the amount of brake effort being exerted. Our improved controller is of such a character as to regulate brake applying power effort as a function of this same resistance with which the driver is already familiar.

In this connection attention is directed to a disclosure in a copending application of Vincent G. Apple, Ser. No. 285,089, filed June 13, 1928. In the present invention the power delivered is controlled over a given range as hereinafter described without appreciable loss of power due to the functioning of the controller and from a given minimum amount to a given maximum amount in a stepless constantly increasing progression proportioned to the resistance offered by the pedal to its brake applying movement.

We have shown our controller as embodied in a tension transmitting section of the mechanical linkage which couples the brakes with the operating pedal, and an object is to provide the same in the form of a simple, rugged, electric spring resistance device which functions as described without appreciably diminishing the electric current as it passes therethrough from the source of current to an electrically operated brake actuating power means.

The foregoing and many other desirable objects and advantages of our invention will become more fully apparent from the following specification, appended claims, and accompanying drawings, wherein,—

Fig. 1 is a diagrammatic view of the electric "booster" brake hook-up.

Fig. 2 is a top plan view of our improved controller with the cover and the pedal stem broken away.

Fig. 3 is a vertical axial section taken at 3—3 of Fig. 2.

Fig. 4 is a diagram of the improved controller connected in an ordinary motor circuit to provide stepless variation in its resistance.

Fig. 5 shows the controller device so inserted in a link of the "booster" hookup that decrease in the resistance is effected by tension in the link.

In the diagrammatic view shown in Fig. 1 we have illustrated our invention embodied in a controller for automotive brake mechanism, though patently it is adapted for various other uses, wherein numeral 10 represents the customary foot pedal used on automotive vehicles for applying the brakes. This foot pedal is hooked up to brake shaft 12 through the links 14, 16, and 18, whereby depression of the pedal 10 results in partial rotation of the brake shaft 12. Element 16 of this linkage chain consists of a strap in which is mounted my improved controller device of which a more detailed description is given hereafter. At each extremity of the brake shaft 12 is secured a brake arm 20 and to these brake arms the operating arms 22 of the several brakes, here shown as front and rear brakes for the front and rear road wheels respectively, are connected by customary tension linkage 24 capable of transmitting mechanical effort to apply the brakes.

At some convenient point on the motor chassis, preferably on one of the side frame members 26 is mounted a power device, herein shown as an electric motor 28, which is designed to exert a power force of application on the brakes which, as here shown, supplements the manual force mechanically applicable thereto. On the armature shaft of this motor is secured a short arm 30 which is connected by a tension member 32 with a long arm 34 attached to the brake shaft 12 to rotate the shaft. The motor 28 is placed in an electrical circuit the making and breaking of which is controlled by the pressure applied to the controller device in a manner to be described.

This controller device, indicated generally as 17, is inserted in the electrical circuit which includes the motor and is adapted to provide a varying resistance proportional to the brake applying pressure exerted on pedal 10. It is in the form of a spring rheostat device included in the electric circuit leading from the source of power to the electric motor and is also included as a tension transmitting member in the mechanical hook up leading from the pedal to the brakes.

To one familiar with the mechanics of springs it is well known that if a coil spring of varying diameter is made of uniform wire, coils of the larger diameter may be extended or compressed with less effort than coils with a smaller diameter. Similarly, if wire is wound into a conical spring and the spring is axially extended or compressed the largest convolution will yield first, the remaining convolutions yielding progressively from the larger to the smaller. It is this principle which is employed herein and adapted to regulate the current flowing through motor 28, thus providing a power effort directly in proportion, within limits, to the mechanical tension being transmitted through the manually operated brake operating linkage. The power effort applied to the brakes is therefore a function of the pressure exerted by the operator on the manual operating member, such as the pedal, rather than a function of the extent of pedal movement.

In the embodiment here shown high resistance spring stock is wound into the form of a clock spring and then pulled into the conical form indicated as in Figure 3. Where steel is used it may be spring tempered in that shape. The outer convolution 40 of the spring is provided with an eye 42 which is bent around the binding post 44. A centrally apertured round metal plate 46 substantially covers the top of an insulation base 48 and is insulated from stem 54 by flange 49. The binding post 44 retains the eye 42 in contact with this plate. It will, therefore, be apparent that in its free state the spring contacts the plate 46 only at its eye portion 42. The base member 48 is composed of insulation material and has mounting ears 50 and 52 embedded therein. The mounting ear 52 serves also as a ground connection.

The pedal stem 54 carried by the tension member 14 has an outer bearing 56 of insulation material and an inner bearing 58 of metal. This inner metal bearing 58 is connected to the ear 52 by the conductive portion 53 of the ear which extends through the base member 48. Pedal stem 54 is provided with a shoulder 60 which falls just below the bearing 56 when the pedal stem is in its normal position. Insulation bushing 62 is secured snugly around pedal stem 54 adjacent to the shoulder 60 and the inner convolution 64 of the spring loosely encircles this bushing. Some sort of collar member, shown in Figure 3 as a nut 66, is secured to the inner end of the pedal stem 54 to limit its upward movement and a light spring 68 is coiled about this stem between the bearing 56 and the stem head 70, which tends to maintain the stem at the outer limit of its movement and also retracts the brake pedal.

Thus it will be manifest that the spring does not make an electrical contact with the stem 54 until the stem has been sufficiently withdrawn to bring the shoulder 60 into contact with the smallest convolution of the spring. When this contact is made an electrical circuit is established from the binding post 44 through the entire length of the spring to the stem 54 and thence through ear extension 53 to the grounded ear 52. As heretofore stated the electro power device 28 is hooked up in this circuit.

As the stem 59 is further withdrawn the spring convolutions flatten out against the metal plate 46, the point farthest from the center always being the next to flatten. The circuit at any stage is from the binding post 44 through the metal plate 46 to that part of the spring last flattened out against the plate and thence through the remainder of the spring to the stem 54. Thus, as the spring is gradually flattened by the sliding movement of the stem, less and less of the metal spring is included in the electrical circuit and the resistance interposed in the circuit is further reduced. When all of the convolutions are flattened against the plate 46 the current will be from binding post 44 through plate 46 to stem 54 without including any of the spring convolutions, except the innermost one 64 which encircles the insulating bushing 62 and the resistance will therefore be at its minimum.

In Fig. 5 we have shown this controller element, broadly indicated by numeral 17 in Fig. 1 and illustrated in detail in Figs. 2 and 3, as it is hooked up in the chain of mechanical brake linkage. The rod 14 is connected at one end to the brake pedal 10 and at the other it is secured to the inner extremity of stem 54 of the controller device. This controller device is mounted in what may be termed strap member 16 and the rod 18 is secured to the other end of strap 17 in axial alignment with rod 14. The other end of rod 18 is hooked up to the brake shaft 12 in the usual fashion.

The operation of our device will be apparent from Fig. 1 of the drawings. Manual effort exerted by brake pedal 10 will transmit power to apply the brakes through the brake shaft 12 in the customary fashion. Pressure on foot pedal 10 will tend to draw the stem 54 of our controller device against the resistance of spring member 68, thus bringing the innermost convolution of the spring member into contact with the shoulder 60 and setting up an electrical circuit through the motor 28 with a maximum resistance in the spring controller.

Further depression of the foot pedal will function to further withdraw the stem thus flattening out the convolutions of the spring progressively inwardly, and progressively decreasing the resistance set up in the power circuit in direct proportion as the pressure exerted on the foot pedal is increased. Thus the motor 28 exerts a torque on the brake shaft 12 tending to apply the brakes which is, within limits, a function of the manual pressure applied to the foot pedal. Should the electrical circuit be broken or the motor 28 incapacitated for any reason, the mechanical linkage whereby the brakes are manually operated will continue to function in the customary manner. The circuit is clearly illustrated in Fig. 4, flowing from the customary storage battery 70 through the electric motor 28, thence to the binding post 44, through the rheostat as described, and grounded at 72. The other terminal of the battery 70 is conveniently grounded at 74.

It will be obvious that any pre-determined ratio of power between that transmitted from the foot pedal and that exerted by the motor may be utilized. In this way it is possible to exert any brake applying force with any given pressure, however great or small, exerted upon the brake pedal. The stepless nature of our improved controller element permits as complete a range of power application as does the customary mechanical brake applying means for the power transmitted to the brakes is always a definite function of the pressure manually exerted.

In application Serial Number 285,089, above referred to, a carbon pile rheostat is employed for a similar purpose, but though the variation of such a type is stepless and the resistance thereof decreases at a constant rate from a determined maximum to a determined minimum, the amount of useful power and effort delivered at the maximum of our present invention is distinctly greater than with the carbon pile rheostat, and the loss of power in functioning is very much less The present structure is also of a strong, rugged, not easily broken character and exercises control within the limits of the spring resistance employed.

Various modifications are apparent to those skilled in the art and we intend to limit ourselves only within the scope of the claims.

We claim:

1. Brake mechanism comprising, in combination, brakes, electric power means coupled therewith to apply the brakes, and a spring conductor arranged in circuit with said electric power means to vary the brake applying effort thereof as the tension on the spring is varied, said spring coupled with the brakes to mechanically exert brake applying effort thereon.

2. In combination with electric brake mechanism, a circuit adapted to energize said mechanism, said circuit including a control element including a coil spring conductor normally adapted to maintain a conical formation, a stem extending axially through the cone so formed and having a portion adjacent the apex thereof adapted to flatten said spring, yieldable means normally maintaining said stem in a position to permit the conical formation of the spring means, means whereby flattening of said spring conductor decreases the resistance in the electric circuit, and means whereby said stem is actuated to flatten said spring conductor in direct proportion to the manual braking pressure exerted.

3. In combination with electric brake mechanism, a circuit adapted to energize said mechanism, a control device for said mechanism including a conical coil spring electrically coupled in said circuit, a constraining surface forming a portion of said circuit adjacent said coil spring, and manual means adapted to flatten said coil spring against the constraining surface whereby the power delivered to the electric brake mechanism is varied.

4. Brake control mechanism comprising, in combination, brakes, electric power operated mechanism for applying the brakes, a circuit for said mechanism, a power varying control device for said mechanism including a conical coil spring forming an electric resistor in said circuit and a terminal plate adjacent said coil spring, and control means for successively flattening each coil of said conical coil spring against said terminal plate to thereby vary the power delivered to said mechanism.

5. Brake mechanism comprising, in combination, brakes, manual operating means to apply the brakes, electric power means to apply the brakes, a resilient control device for said power means, said control device having a spring electrically coupled with the power means to regulate the brake applying power effort thereof and with the manual means to yield to vary the brake applying effort of the power means.

6. Brake mechanism comprising, in combination, brakes, manual operating means to apply the brakes, electric power means to apply the brakes, a control device for said power means, said control device having a resilient member electrically coupled with the power means to regulate the brake applying effort thereof and with the manual means to yield to manual effort exerted thereon to vary the brake applying effort of the power means as the brake applying effort exerted by the manual operating means varies.

7. Brake mechanism comprising, in combination, brakes, electric power means to apply the brakes, manual operating means to apply the brakes including as a tension transmitting part thereof a spring electrically coupled with said power means and forming a control mechanism therefor, said spring control mechanism adapted to yield as the brake applying effort of the manual operating means is varied and to vary the brake applying effort of the power means as it yields.

8. Brake mechanism comprising, in combination, electric power means to apply the brakes, manual operating means to apply the brakes including as a tension transmitting part thereof a spring electrically coupled with said power means and forming a control mechanism therefor, said spring control mechanism adapted to yield as the brake applying effort of the manual operating means is varied and to vary the brake applying effort of the power means as it yields and in direct proportion to the brake applying effort of the manual operating means.

9. Vehicle brake mechanism comprising, in combination, brakes, power mechanism for applying the brakes, a manually operable brake applying member having connections with said brakes to apply the same, and an elastic member constituting a variable controller for said power mechanism yieldingly but increasingly resisting movement of said member and adaptable to vary the power delivery of said power mechanism in direct accordance with the resistance with which said means imposes against the movement of said member.

VINCENT G. APPLE.
FREDERICK W. COTTERMAN.